Oct. 3, 1961 R. H. WEILAND ET AL 3,002,719
CARGO HANDLING EQUIPMENT FOR CARGO AIRPLANES
Filed Aug. 10, 1959 3 Sheets-Sheet 2

INVENTORS.
RICHARD H. WEILAND
RAY W. HAMILTON
BY
Reynolds, Beach & Christensen
ATTORNEYS

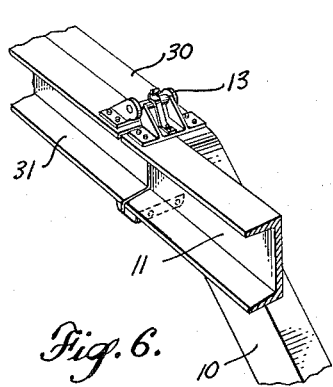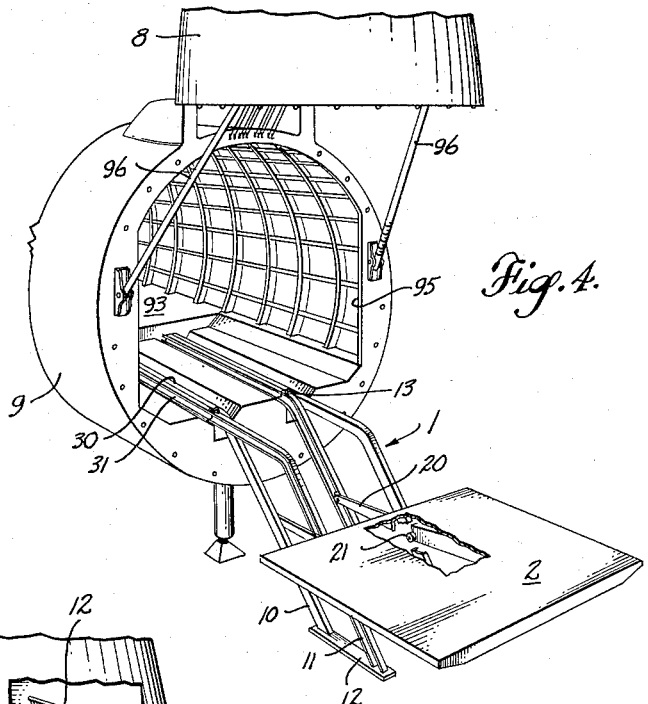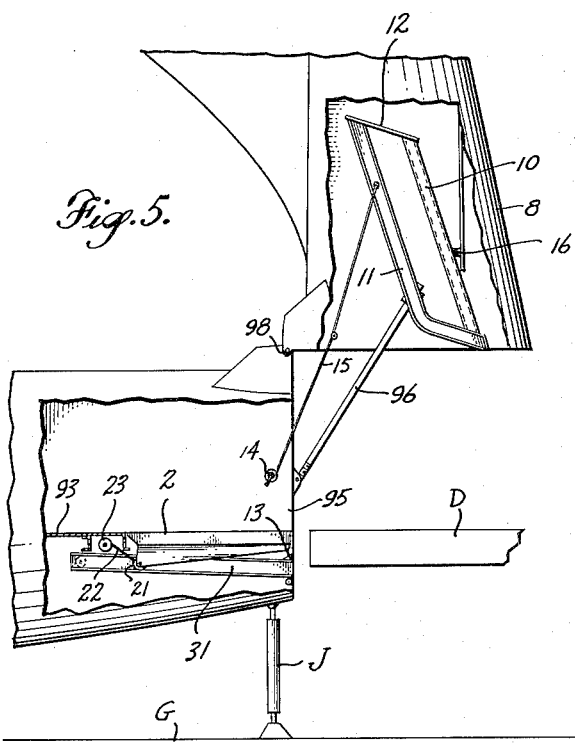

United States Patent Office 3,002,719
Patented Oct. 3, 1961

3,002,719
CARGO HANDLING EQUIPMENT FOR
CARGO AIRPLANES
Richard H. Weiland, Seattle, and Ray W. Hamilton, Kirkland, Wash., assignors to Boeing Airplane Company, Seattle, Wash., a corporation of Delaware
Filed Aug. 10, 1959, Ser. No. 832,701
3 Claims. (Cl. 244—137)

This invention relates to a cargo airplane, such as may be required to transport large, heavy cargo units to and from airfields of an improvised or rough nature, lacking in the ground equipment for handling such cargo units. The airplane has a swinging tail section which can be swung open from a flight position wherein it constitutes a rearward continuation of the fuselage, in its open position affording unobstructed access to the cargo space within the fuselage proper. Cargo handling equipment is carried by the airplane, and in the main is stowed during flight within the tail section; upon opening of the tail section it can be moved into operative position to lower or to elevate the cargo units between the elevated deck of the cargo space and the ground. For cargo units especially difficult to handle, or for self-propelled cargo units, provision can be made for positioning a ramp in operative position, or an elevator can be used to hoist the cargo. In either case use is made of track elements and hoists which are part of the equipment carried by the airplane.

The general nature and objects of the invention having been thus explained, and the drawings showing typical forms of the invention, the invention will be best understood as these forms are explained in this specification, and the novel features of the invention will be set forth in the claims.

FIGURE 4 is a general isometric view of the cargo handling equipment with parts in the positions shown in full lines in FIGURE 3.

FIGURE 5 is a view similar to FIGURE 3 but showing the airplane positioned with relation to a loading dock or the like on a level with the cargo deck of the airplane.

FIGURE 6 is an isometric detail of a disconnectible hinge joint in the cargo handling equipment.

FIGURE 7 is a view similar to FIGURES 3 and 5 illustrating a loading ramp employed in connection with the cargo handling equipment.

FIGURE 8 is an isometric detail of the loading ramp in operative position.

Figure 1:
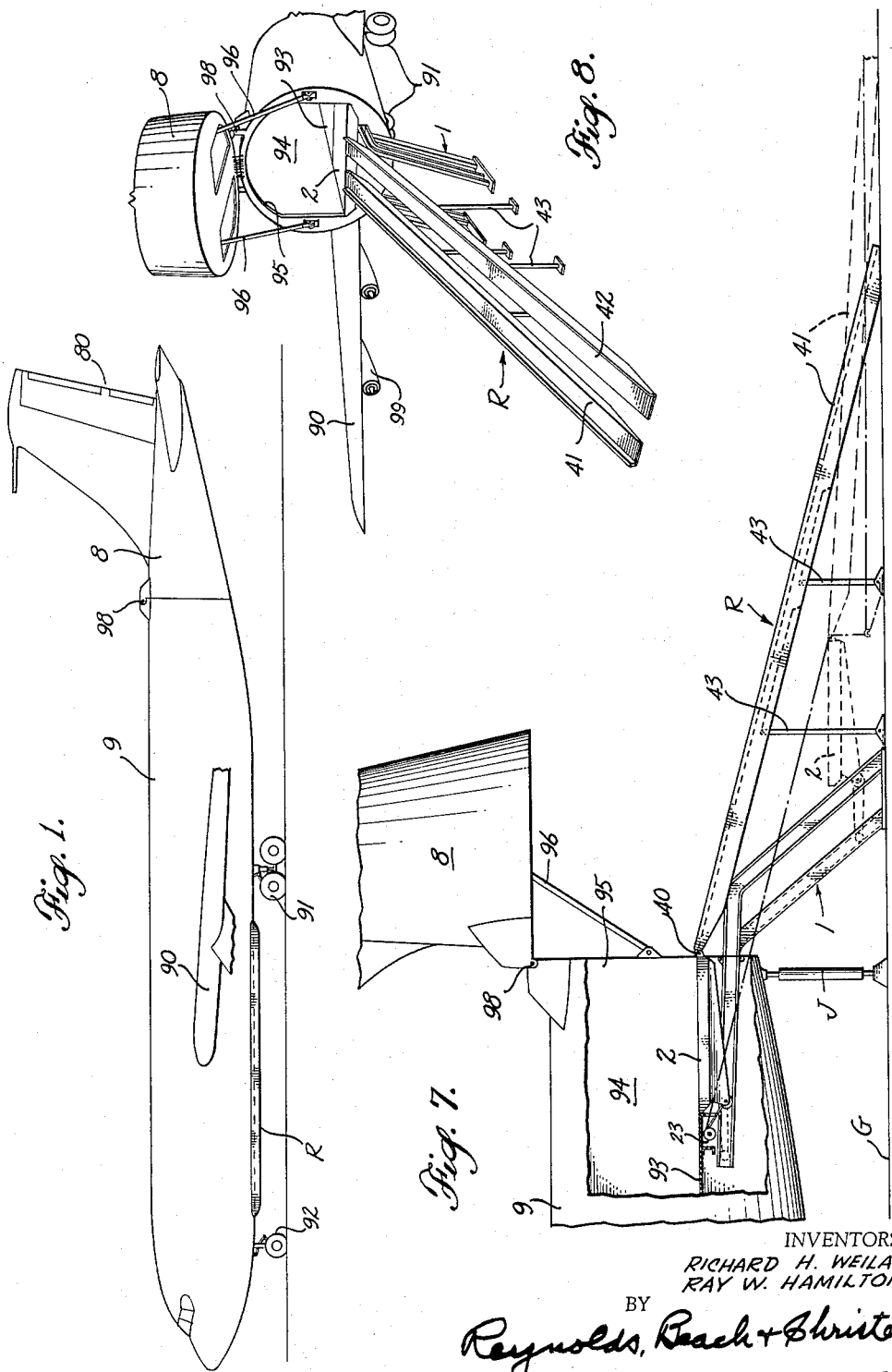
FIGURE 1 is a general side elevation of a cargo airplane embodying the present invention.

The airplane is, in general, of the type disclosed in a companion application of Ray E. Pearson, Serial No. 832,699, filed August 10, 1959, or in an application of Richard H. Weiland, Serial No. 832,700, filed the same date. It includes a fuselage 9 airborne by wings 90 and powered normally by jet engines 99 (see FIGURE 8), the fuselage terminating near its rear end at or near the last station of constant diameter, at least of the upper part of the fuselage, and being completed by a tail section 8 hingedly mounted, as for example at 98, upon the fuselage 9. The tail section 8 constitutes a rearward continuation of the streamlined shape of the fuselage and it carries the empennage generally indicated by the numeral 80. Whether the tail section swings upwardly about a horizontal transverse hinge axis to open, as in the Weiland application, or about an upright hinge axis to swing aside, as in the Pearson application, is not material so far as the present invention is concerned. The showing herein is of the former type. When groundborne, the airplane is supported upon landing wheels 91 and 92 so that the deck 93 within its cargo space 94 is elevated above the ground (as much as ten feet in a specific design), for the swings 90 of this type of airplane tend to droop and the engines depend beneath the wings, so that the airplane must be supported on the ground with the fuselage level and its cargo deck 93 elevated an appreciable distance above the ground line G.

Swinging of the tail section 8 aside or up affords free access through the opening 95 into the cargo space 94. Swinging of the tail section may be accomplished by suitable means such, for example, as the lead screws 96 and mechanism (not shown) for rotation of nuts threaded upon these lead screws and carried by the tail section. When open, if the tail is swung upwardly, the lead screws 96 afford rigid braces for the support of the tail section.

Where the airplane can be maneuvered into position adjacent a loading dock D as in FIGURE 5 that is on a level with the deck 93 there is no appreciable problem involved in loading the cargo aboard or from the airplane. Such a loading dock, however, is not frequently available at improvised or temporary airfields, such as dispersed bases, and while the surface of such airfields may be adequate to enable landing of such an airplane, it may not be well adapted to the use of mobile cargo handling equipment such as lift trucks, elevators and the like, nor may such equipment be available at fields of this type. The problem involved in the present invention, therefore, is to provide mechanism which can be carried by the airplane itself which will not infringe upon any of the space intended for the handling of cargo proper, which is light, and which is readily available for the handling of the cargo between the deck 93 and the ground where other types of cargo handling installations or equipment are not available.

In its broadest aspect the cargo handling equipment of the present invention comprises cargo supports which during flight can be stowed aboard the airplane, and usually within the tail section; which when the airplane is groundborne and the tail section is swung open will extend rearwardly and support and guide cargo for movement between the ground level G and the deck level 93. In this broad aspect the cargo handling equipment may include overhead, rearwardly projecting track means and a carriage running therealong, with a hoist to lift the cargo from the ground, whereupon it is guided into the cargo space, as in a companion application of R. H. Weiland and D. W. Kelton, Serial No. 832,612, filed August 10, 1959, or it may include, as shown herein, tracks which are capable of being stowed in the tail section 8 during flight and which, when the airplane is groundborne, can be let down into inclined operative position to hoist cargo between the ground level and the deck level or to assist in the placement of other cargo handling equipment, such as a long inclined ramp, so that cargo can be handled along such a ramp.

In FIGURE 4, the rear end of the airplane is shown groundborne and with the tail section swung up to afford free straight-in access through the opening 95 to the interior of the cargo space, and with a track element generally designated by the numeral 1 extending rearwardly and then downwardly from the opening 95 to guide the platform or elevator 2 for movement between ground level and the level of the deck 93. The deck 93 at its rear end may be recessed to afford space for the elevator 2 to enter the cargo space and to come flush with the deck, as in the position shown in FIGURE 5. This is its flight position.

The track element 1 is shown as consisting of a pair of supports, each including two upright rails 10 and 11 joined at 12 at the lower end of the rails, and merging at their upper ends with horizontal rails 30 and 31 which are a permanent installation within the airplane structure. Arms 20 which support the platform 2 carry rollers such as 21 that are guided in the respective rails so that the platform in being elevated remains level, and when it reaches the deck level will move inwardly into the cargo space. Movement of the elevator is accomplished by suitable means such, for instance, as the cable 22 (see FIGURE 3) extending about a power winch 23 installed beneath the deck.

Figure 2:
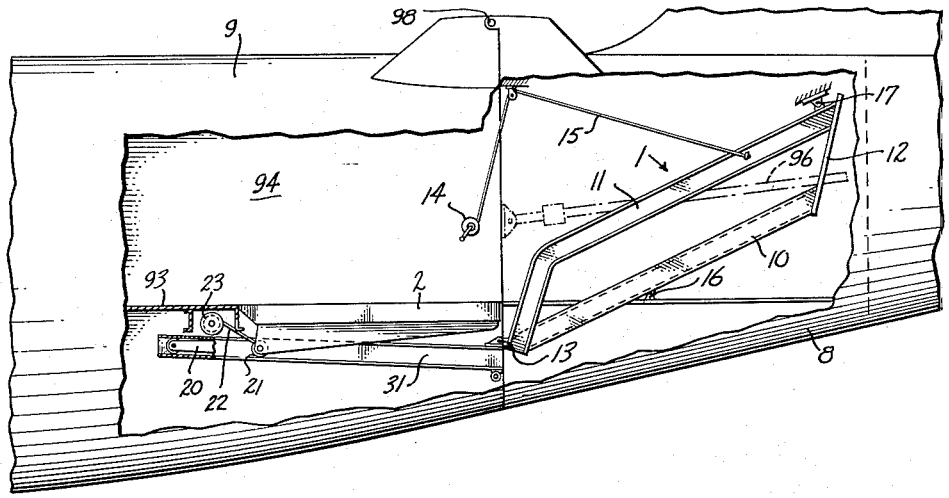
FIGURE 2 is an enlarged side elevation, broken away to illustrate the cargo handling mechanism stowed in flight position.
Figure 3:
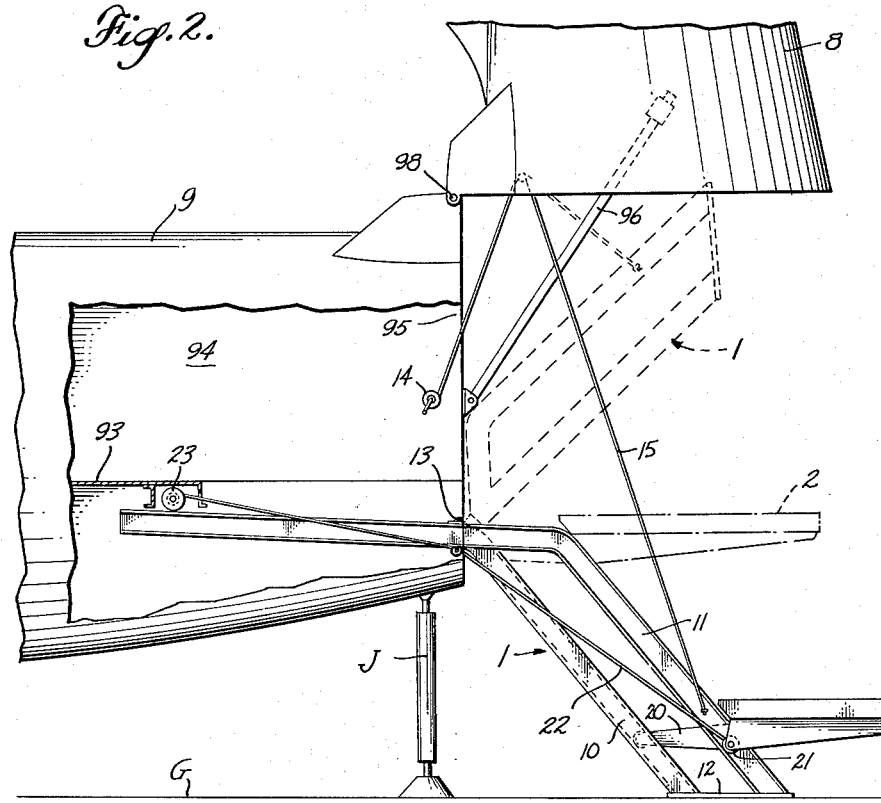
FIGURE 3 is a similar view showing the tail section open and the cargo handling equipment in operative position.

The track structure 1 must be moved from its operative position as shown in FIGURES 3 and 4 to a stowed position prior to the closure of the tail section 8 into flight position. This can be conveniently accomplished by hingedly connecting the track structure 1 at 13 to the rear end of the fuselage-mounted tracks 30, 31. Hoisting means such as the hand-operated winch 14 installed upon the airplane and connected to the outer end of the track structure 1 by a cable 15 may be employed to hoist the track section 1 into a position as shown in FIGURE 2 or in dash lines in FIGURE 3, wherein it is in alignment with the opening in the tail section 8, so that, as the tail section 8 swings into its closed position, it houses in the track structure 1. It may be then permanently secured in place as, for instance, by the fastening elements 16, 17 and, since it may be desirable to keep the track section 1 stowed even when the airplane is groundborne as, for instance, when it is positioned adjacent a loading dock D. This may be readily accomplished merely by disconnecting the pivot at 13 and leaving the securing means 16 and 17 secured to the track structure, whereby the tail section with the track structure still stowed within it may be swung clear of the opening 95, leaving the tracks 30, 31 still installed and the platform 2 on a level with the deck 93 for the loading of cargo by movement directly off the dock into the cargo space 94. Otherwise, when the elevator 2 is to be used, the track structure 1 is unstowed from the tail section and moved downwardly and outwardly into the position shown in FIGURES 3 and 4, and the elevator 2 can then be moved upwardly and downwardly along the tracks 10, 11 and the communicating tracks 30, 31 to transport cargo between the ground level G and the deck level at 93. It may be desirable in such usage to insure stable support of the tail end of the fuselage as, for instance by a jack J.

Some cargo will be so long and awkward to handle, or otherwise bulky, that it cannot be handled properly by the relatively small elevator 2, which is only of a size to fit within the rear end of the cargo space. In such a case, use is made of a ramp R which can be carried within the cargo space or in the position shown in FIGURE 1, stowed beneath the belly of the fuselage 9 in flight. This ramp conveniently includes two spaced rails 41, 42 of sufficient length to form a long incline from the deck level 93 to the ground level G. For the convenient handling of such ramps, provision is made for connecting them at 40 to the elevator 2, whereupon the elevator rising along the track structure 1 will lift the forward end of the ramps to the deck level, leaving the rear end of the ramps supported on the ground. The elevator 2 in its upraised position will then constitute a smooth continuation of the ramps, in the nature of a bridge between the ramps and the deck 93. Winch or hoist mechanism (not shown) may be employed, mounted within the fuselage, to haul cargo units up the ramps 41, 42, or if the cargo units are self-propelled vehicles, these may propel themselves up or down the ramp into or from stowed position. Bracing struts 43 may be carried by the ramp elements to support the intermediate portions of the latter from the ground.

By the equipment described above, the airplane is capable of handling substantially all types of cargo and at fields having no cargo handling equipment. The equipment carried by the airplane is stowable in space not suitable for use in stowing cargo, and can be lightly constructed so that it imposes no great weight penalty. It is simple to operate and to stow.

We claim as our invention:

1. A cargo airplane comprising a fuselage the cargo compartment whereof terminates aft in an open end, a tail section hingedly mounted upon said fuselage for swinging between a flight position, wherein it constitutes a rearward continuation of the fuselage and closes the latter's open end, and an open position clear of such open end, a track which in use while the airplane is groundborne is secured to the fuselage and protrudes rearwardly and downwardly from the cargo compartment's open end, means to secure said track in an alternate stowed position within the airplane, a track extension carried by the fuselage and located to constitute a forward extension of the track when the latter is in its position of use, and an elevator guided for movement along the track and track extension for handling of cargo between the ground and the deck level of the cargo compartment.

2. A cargo airplane comprising a fuselage the cargo compartment whereof terminates aft in an open end, a tail section hingedly mounted upon said fuselage for swinging between a flight position, wherein it constitutes a rearward continuation of the fuselage and closes the latter's open end, and an open position clear of such open end, a track structure, including two parallel track elements, which in use while the airplane is groundborne is secured to the fuselage, and each of which elements protrudes rearwardly and downwardly, in fore and aft spaced disposition, from the cargo compartment's open end, a track extension from the upper ends of each track element, extending generally forwardly within the fuselage, a platform, and means including arms extending forwardly from the platform and guided in both said track elements, and in the extensions thereof when upraised, for handling cargo between ground and to and within the interior of the cargo compartment.

3. A cargo airplane comprising a fuselage the cargo compartment whereof terminates aft in an open end, a tail section hingedly mounted upon said fuselage for swinging between a flight position, wherein it constitutes a rearward continuation of the fuselage and closes the latter's open end, and an open position clear of such open end, a track movable relative to the fuselage and tail section between a position of use, wherein it protrudes rearwardly and downwardly from the cargo compartment's open end towards the ground, and a stowed position, means to secure the track to the fuselage while in its position of use, a track extension carried within the fuselage and located to constitute a forward extension of the track itself when the latter is in its position of use, a cargo deck supported within the fuselage and terminating rearwardly ahead of said track, when the latter is in its position of use, an elevator platform guided for movement along said track between deck level and a lower level adjacent the ground, and along said track extension, and when drawn forwardly along the track extension within the fuselage constituting a continuation of the cargo deck, and means so to move said elevator platform.

References Cited in the file of this patent

UNITED STATES PATENTS

| | | |
|---|---|---|
| 2,323,279 | Van Zelm | June 29, 1943 |
| 2,414,447 | Cargile | Jan. 21, 1947 |
| 2,536,954 | Olsen | Jan. 2, 1951 |
| 2,732,960 | Nilson | Jan. 31, 1956 |